US012561113B2

(12) United States Patent
Grant et al.

(10) Patent No.: US 12,561,113 B2
(45) Date of Patent: Feb. 24, 2026

(54) SYSTEMS AND METHODS FOR UNSTRUCTURED AND STRUCTURED DATA-DRIVEN SORTING

(71) Applicant: Nationstar Mortgage LLC, Coppell, TX (US)

(72) Inventors: Bryan Grant, Melissa, TX (US); Zach Rusk, Argyle, TX (US)

(73) Assignee: National Mortgage LLC, Coppell, TX (US)

( * ) Notice: Subject to any disclaimer, the term of this patent is extended or adjusted under 35 U.S.C. 154(b) by 0 days.

(21) Appl. No.: 18/442,947

(22) Filed: Feb. 15, 2024

(65) Prior Publication Data

US 2025/0265037 A1     Aug. 21, 2025

(51) Int. Cl.
| | |
|---|---|
| *G06F 7/08* | (2006.01) |
| *G06F 16/334* | (2025.01) |
| *G06F 16/335* | (2019.01) |
| *G06F 16/38* | (2019.01) |
| *G06V 30/19* | (2022.01) |
| *G06V 30/416* | (2022.01) |

(52) U.S. Cl.
CPC .............. *G06F 7/08* (2013.01); *G06F 16/334* (2019.01); *G06F 16/335* (2019.01); *G06F*

*16/38* (2019.01); *G06V 30/19007* (2022.01); *G06V 30/416* (2022.01)

(58) Field of Classification Search
CPC .......... G06F 7/08; G06F 16/334; G06F 16/38; G06F 16/335; G06V 30/19007; G06V 30/416
See application file for complete search history.

(56) References Cited

U.S. PATENT DOCUMENTS

| | | | | |
|---|---|---|---|---|
| 11,061,874 B1 * | 7/2021 | Funk | ................... | G06F 16/2468 |
| 2008/0247004 A1 * | 10/2008 | Yeung | ................ | H04N 1/00244 |
| | | | | 358/486 |
| 2019/0147103 A1 * | 5/2019 | Bhowan | ............... | G06V 10/454 |
| | | | | 707/737 |

* cited by examiner

*Primary Examiner* — William P Bartlett

(74) *Attorney, Agent, or Firm* — Pierson Ferdinand LLP; Daniel Rose

(57) ABSTRACT

In some aspects, the disclosure is directed to methods and systems for sorting, correlation, and/or matching of structured and unstructured data. In some implementations, metadata associated with structured data may be applied to unstructured data based on the results of the sort or correlation. Such sorting or matching may be performed through an efficient iterative process with progressive confidence scores, and use a priori knowledge from correlations between structured data values to identify potentially associated unstructured data values.

16 Claims, 6 Drawing Sheets

SYSTEMS AND METHODS FOR UNSTRUCTURED AND STRUCTURED DATA-DRIVEN SORTING

FIELD OF THE DISCLOSURE

This disclosure generally relates to systems and methods for data processing. In particular, this disclosure relates to systems and methods for unstructured and structured data-driven sorting.

BACKGROUND OF THE DISCLOSURE

Data can be, and frequently is, associated with a structure or metadata that describes a format or syntax of the data. For example, data may be explicitly structured with named parameters and corresponding values, as in parameter-value tuples or tagged XML data. In some instances, data may have a structure as a result of other data, such as named fields on a form and corresponding values for the fields. However, data may also be unstructured, lacking any such metadata or explicit or implicit identifications of data types or meanings. Sorting unstructured data may be relatively simple, but naive, such as sorting alphabetically or by increasing value. Sorting structured data may be more intelligent, taking into account meanings and inter-relationships of fields, such as months and years in date fields, or dollars and cents in financial transactions. However, when unstructured and structured data are mixed or utilized together, conventional systems tend to fall back to the naive and simple sorting for all data, regardless of structure. This may obfuscate those interrelationships among the data and make it more difficult to process further. In particular, it may be difficult to sort and correlate or match unstructured and structured data items, and conventional systems may have low accuracy and low efficiency.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

The details of various embodiments of the methods and systems are set forth in the accompanying drawings and the description below.

DETAILED DESCRIPTION

For purposes of reading the description of the various embodiments below, the following descriptions of the sections of the specification and their respective contents may be helpful:

Section A describes embodiments of systems and methods for unstructured and structured data-driven sorting; and Section B describes a computing environment which may be useful for practicing embodiments described herein.

A. Systems and Methods for Unstructured and Structured Data-Driven Sorting

Data can be in both structured and unstructured forms. As used herein, structured data may refer to data associated with a structure or metadata, explicit or implicit, that describes a format, meaning, or syntax of the data. For example, data may be explicitly structured with named parameters and corresponding values, as in parameter-value tuples, tagged XML data, data with labeled fields, data with associated metadata such as type identifiers, etc., referred to generally as "metadata". In some instances, data may have a structure as a result of other data, such as named fields on a form and corresponding values for the fields, or a position of fields on a form (e.g. a printed name line below a signature line, such that the printed name is implied to be associated with the signature).

Data may also be unstructured. As used herein, unstructured data may refer to data that lacks any implicit or explicit structure or metadata that defines or provides meaning or syntax to the data. Unstructured data may include lists of strings, numeric or alphanumeric values, bitmaps, or any other such data. In some instances, data may be unstructured because it has lost or become disassociated from its structure. For example, data captured as an image of a printed page may lose associated metadata. Even if subsequently processed via optical character recognition (OCR), the resulting alphanumeric data may be unstructured, lack associated labels, combine text across different columns, etc.

Data, both structured and unstructured, may be in any suitable form, such as binary data, XML data, spreadsheets, databases, compressed or uncompressed data, encrypted or unencrypted data, or any other type and form of data. In some implementations, data may be in multiple forms, such as structured data in XML data or a spreadsheet with cell relationships, and unstructured data as a flat file or binary data.

Figure 1:
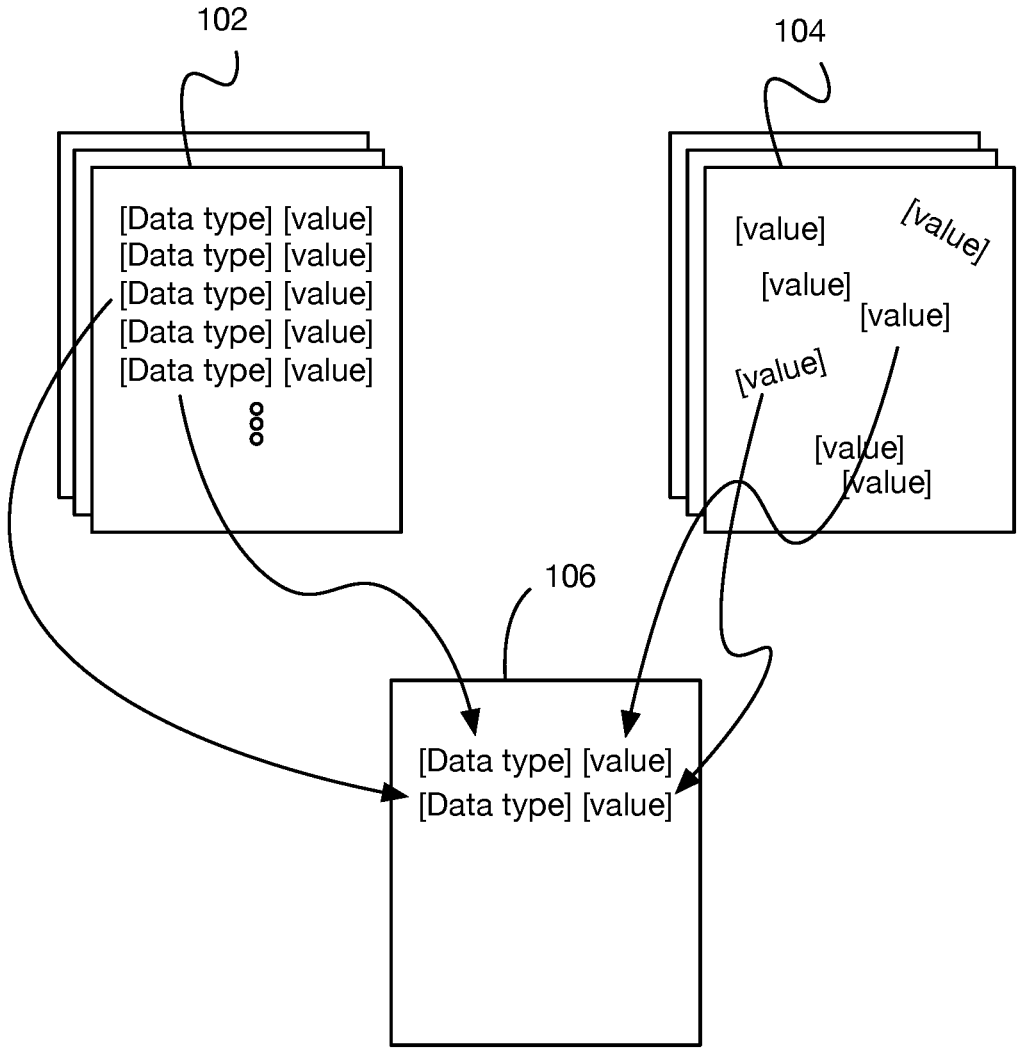
FIG. 1 is an illustration of an example of unstructured and structured data-driven sorting, according to some implementations.

Sorting unstructured data may be relatively simple, but naive, such as sorting alphabetically or by increasing value. Sorting structured data may be more intelligent, taking into account meanings and inter-relationships of fields, such as months and years in date fields, or dollars and cents in financial transactions. However, when unstructured and structured data are mixed or utilized together, conventional systems tend to fall back to the naive and simple sorting for all data, regardless of structure. This may obfuscate those interrelationships among the data and make it more difficult to process further. In particular, it may be difficult to sort and correlate or match unstructured and structured data items, and conventional systems may have low accuracy and low efficiency For example, FIG. 1 is an illustration of an example of unstructured and structured data-driven sorting, according to some implementations. Structured data 102 may comprise data with associated metadata, such as data types and values (other identifiers or parameters may be used in other implementations). Unstructured data 104 may comprise data without associated metadata or structure.

Data may be sorted from source data 102, 104 into structured destination data 106, which may be referred to variously as output data, matched data, correlated data, or by similar terms. As discussed above, sorting may refer both to placing data from source data 102, 104 into an ordered list (e.g. relative order, absolute order, etc.), as well as, in some implementations, matching or correlating data between structured source data 102 and unstructured source data 104. For example, in some implementations, structured source data 102 may be associated with unstructured source data 104, but the structure of the latter may have been lost during ingest of the data (e.g. during optical scanning of printed pages). For example, data may comprise medical data such as structured electronic health records and unstructured physician notes, and may be correlated or matched or otherwise sorted together based on patient identifiers (e.g. names, dates of birth, addresses, or other identifiers). In another example, data may comprise financial data such as invoices, receipts, purchase orders, transaction records, etc., and may include both structured data such as a list of transactions from a checking account and unstructured data such as scanned receipts. In some implementations, structured and unstructured data may appear together on a document, for example structured data such as dates or account identifiers and unstructured data such as goods or service descriptions or narratives. During ingest of the data, associations between the data even on the same document may be lost, and accordingly, sorting, correlating, or matching the structured and unstructured data may provide recovery of these associations.

Figure 2:
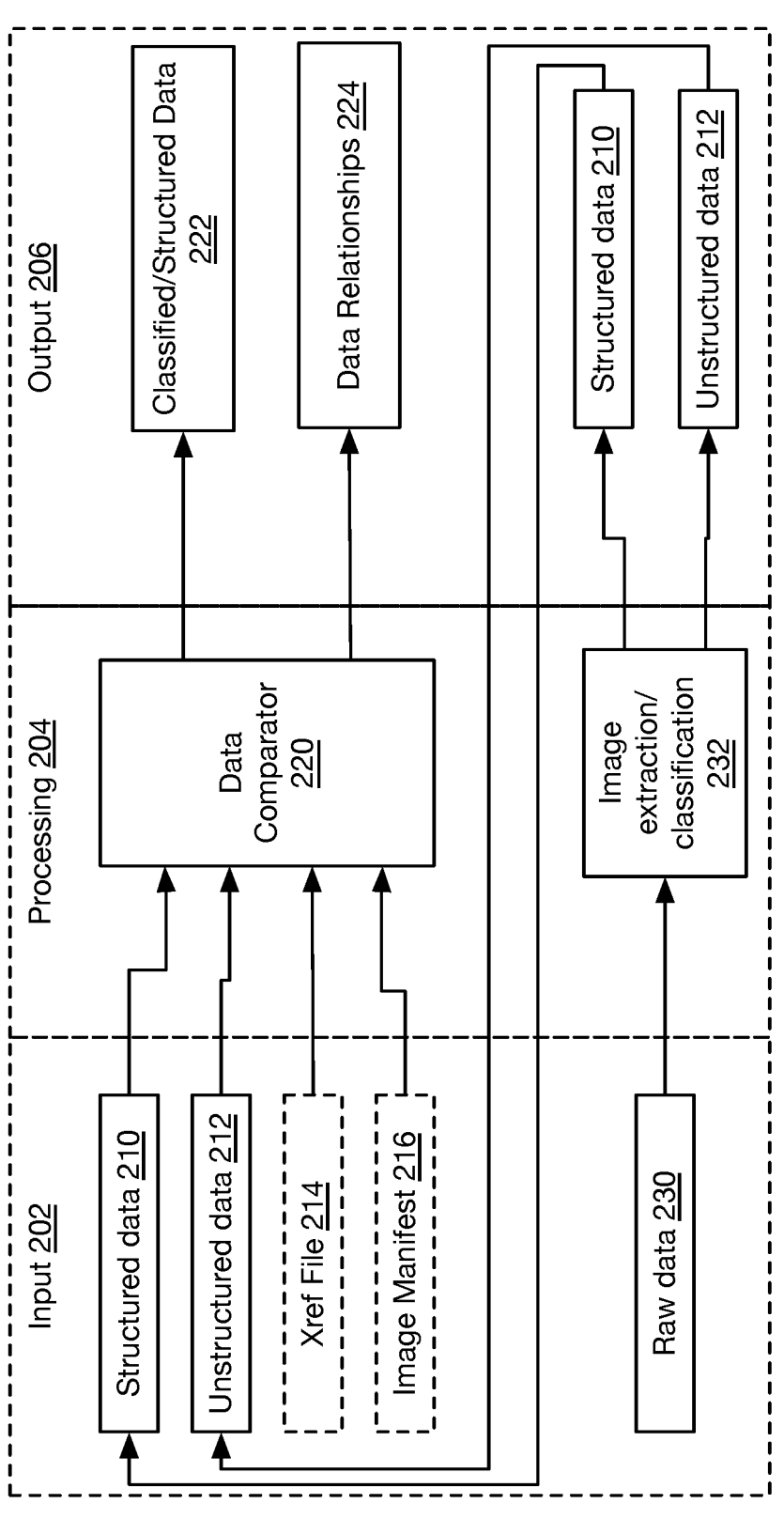
FIG. 2 is a block diagram of a system for unstructured and structured data-driven sorting, according to some implementations.

FIG. 2 is a block diagram of a system for unstructured and structured data-driven sorting, according to some implementations. The system may be divided into three conceptual or logical blocks: input 202, processing 204, and output 206. As shown, however, outputs of output section 206 may be provided as inputs to input section 202.

Structured data 210 (which may comprise or be similar to structured data 102) and unstructured data 212 (which may comprise or be similar to unstructured data 104) may be received as input and/or generated by the system. For example, raw data 230 may comprise documents and/or images of documents (e.g. scanned documents, received facsimiles of documents, etc.) as well as other raw data, such as spreadsheets, word processing data, image data, presentation data, binary data, compressed or encrypted data, or other such data. As used herein, data may refer variously to individual entities (e.g. a string, a value, a parameter, an image, etc.), which may also be referred to as items of data, or to sets of entities (e.g. a page of values, an array of strings, a set of parameter-value pairs, etc.), which may also be referred to as sets (or subsets) of data, a plurality of data items, or by similar terms. In some instances, a set of data may consist of a single item of data (e.g. a page with one value on it, or a selected set of data containing one item).

In some implementations, the raw data 230 may be ingested into the system (e.g. received or retrieved via a network from a remote device, loaded from a memory device including portable devices or devices installed in the system, scanned or photographed or captured as images and/or video, or otherwise input into the system) and processed. For example, in some implementations, raw data 230 may comprise images of documents and the documents may be processed by an image extractor and/or classifier 232, such as those described in U.S. Patent Application Publication Nos. 2022/0051043, 2022/0051009, 2022/0057496, or 2023/0101817, the entirety of each of which are incorporated herein by reference. For example, in some implementations, a machine-learning based document classifier may attempt to identify values within raw data 230 and classify the values with corresponding structure or metadata, based on graphical structures within the raw data 230 (e.g. lines, boxes, or other shapes corresponding to a predetermined form or document template), based on classified or categorized data of the corresponding document or related documents (e.g. preceding and successive documents), based on matches to predetermined expressions (e.g. user or account identifiers of specified lengths or having particular syntax or positions of numeric and alphabetical characters, etc.), or any other such information. In some implementations, the extraction/classification process 232 may generate structured data 210 and be able to generate fields, tags, classifications, or other metadata for a data value. In other implementations, the extraction/classification process 232 may be unable to identify structure and may generate unstructured data 212. In some implementations, the extraction/classification process 232 may generate both structured and unstructured data (for example, if the extraction/classification process 232 is able to identify an account number on a scanned image of a form, but is unable to recognize data in fields of the form or which fields are associated with what types of data.

The structured data 210 and unstructured data 212 may be provided to a data comparator 220. Data comparator 220 may also be referred to as a correlator, a matcher, a sorter, or by similar terms, and in many implementations may apply one or more sorting or matching algorithms to subsets of structured data 210 and unstructured data 212. In some implementations, the data comparator 220 may be provided with additional data about or associated with the structured data 210 and unstructured data, sometimes referred to as context data. For example, in some implementations, context data may indicate that a particular item of structured data 210 is associated with another item of structured data 210 and/or with an item of unstructured data 212. For example, context data may indicate that an item of structured data 210 was found on the same scanned document as an item of unstructured data 212. While this alone may not be sufficient to provide structure to the unstructured data 212, knowledge of the association may be useful for classifying or matching the unstructured data 212 to other structured or unstructured data. For example, a priori knowledge that a first alphanumeric string was found on the same document as a second alphanumeric string that was positively associated with or classified as an account identifier may help the comparator 220 determine that the first alphanumeric string may be excluded as an account identifier (if multiple account identifiers are unlikely to occur on that type of document). Context data may accordingly include a cross-reference file 214, document metadata (i.e. metadata associated with a document from which unstructured or structured data is extracted that may identify the document but not necessarily the data, such as a page color, a page size, a watermark, a document source such as a particular server or IP address, etc.), or any other type and form of information. In some implementations, such as where unstructured and structured data is extracted from images, the data comparator 220 may be provided with an image manifest 216 or set of raw images. The image manifest 216 may be provided with output data from the system, in some implementations, allowing further computing devices to process the extracted and sorted data along with the original source images (e.g. to allow image annotation, verification, etc.).

As discussed above, data comparator 220 may apply one or more matching or sorting algorithms to items of structured data 210 and/or unstructured data 212. For example, data comparator 220 may select a set or subset of unstructured data, such as ten items of data, and an item of structured data, and may compare each of the unstructured data items to the item of structured data to determine whether they match, or sort the data items to exclude unstructured data items not neighboring or adjacent to the structured data in the resulting sorted list. For example, if the structured data comprises an invoice value and the items of unstructured data comprise various different values and one value identical to the invoice value (or within a small amount of the invoice value), then the data comparator 220 may identify a match, or may sort the identical unstructured data value with the structured data value in an output list. Various matching or sorting algorithms may be applied iteratively, in some implementations. In some such implementations, each algorithm may be associated with a confidence level or score for the match or sort. For example, a quick sort that sorts alphanumeric data in alphabetical order may be fast and highly efficient, but may miss correlations between similar data items, and accordingly may be associated with a low confidence level or score. Another algorithm may comprise a machine learning classifier that may sort unstructured data items into clusters and identify a cluster corresponding to a structured data item, and may have an associated high confidence score or level. Other potential algorithms include regular expressions (regex), pattern matching, graph matching, etc. In some implementations, values from a plurality of associated unstructured data items may be aggregated (e.g. summed, in some implementations, or combined as a pair of discrete but associated values) for matching or sorting with a structured data item. For example, unstructured patient data including a date and physicians notes may be matched together with structured data including a name of the physician and a list of patients seen on a particular date. In another example, structured data of a payment transaction identifying a total amount may by matched to unstructured data that, together, adds up to the same total amount, implying that the unstructured data may correspond to line items of a transaction. Various combinations of dates, total transaction values, account or patient identifiers, physician or provider identifiers, or other such data may be matched with various corresponding confidence levels. Similarly, in some implementations, fuzzy matches may be made at lower confidence levels (e.g. matching of a date and total transaction value may be at a high confidence, while matching of similar dates, such as within a week, and the same total transaction value may be at a lower confidence).

In some implementations, the output of the data comparator 220 may include classified and/or structured data 222, which may comprise structured data 210 and/or unstructured data 212 which has been associated with metadata or classifiers (thus adding structure to the unstructured data). In some implementations, the output of the data comparator 220 may include an identification of one or more matches or relationships 224 between items of input structured and unstructured data 210, 212. For example, data relationships 224 may comprise identifications of unstructured and structured data associated with the same electronic health record, same transaction, or other such associations. For instance, with unstructured and structured data relating to photographic images captured at various locations and times, data relationships 224 may allow for associations between metadata of one image (e.g. geolocation data) and an image lacking metadata (e.g. applying the same geolocation data to the unstructured data of the image, due to a match or correlation between the underlying structured and unstructured data). Data relationships 224 may be stored in any suitable format, such as an array of identifiers of unstructured and structured data as associated pairs or sets, as metadata attached to the data (e.g. in a header), in a separate file such as a relational database, as indexed data tuples (e.g. indexed by identifiers of the unstructured and/or structured data), etc.

Figure 3:
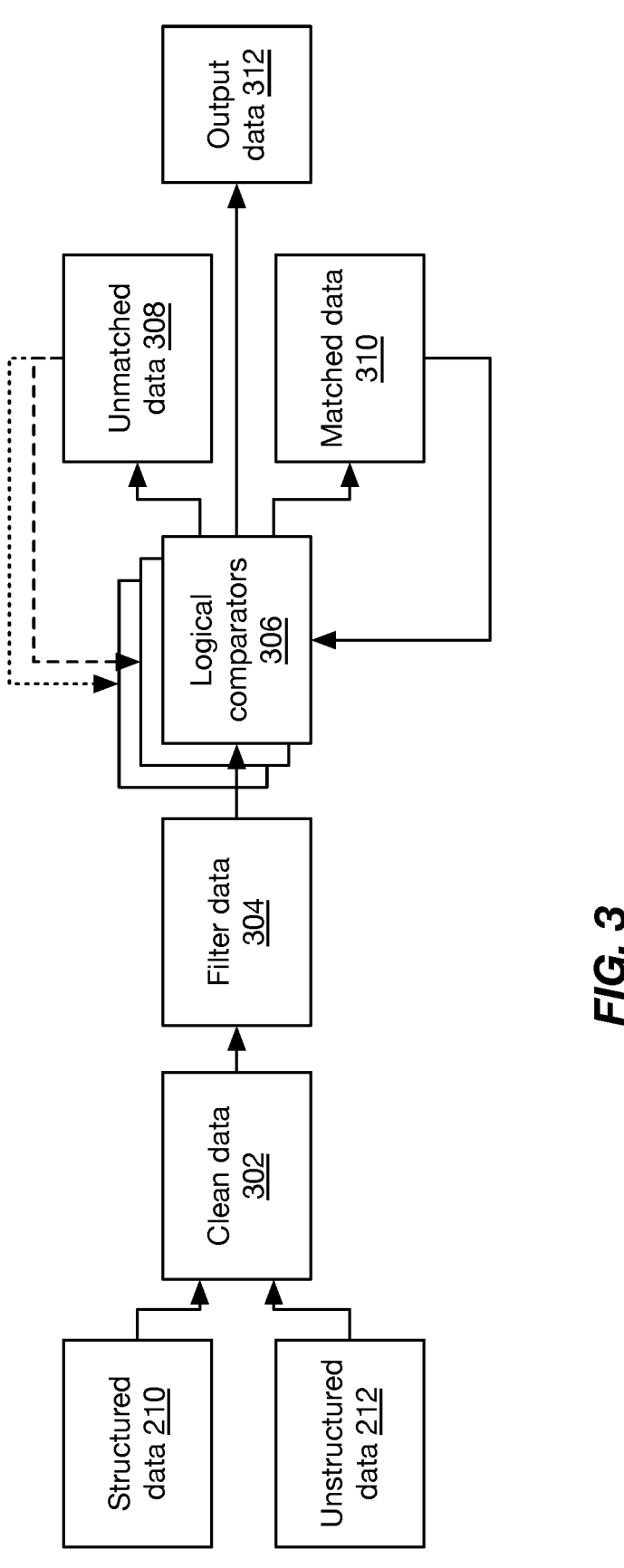
FIG. 3 is a functional diagram of a method for unstructured and structured data-driven sorting, according to some implementations.

FIG. 3 is a functional diagram of a method for unstructured and structured data-driven sorting, according to some implementations. In some implementations, structured data 210 and unstructured data 212 may be ingested (including capture and classification in some embodiments, as discussed above in connection with FIG. 2) and, at step 302 in some implementations, may be cleaned. Cleaning data may comprise normalizing the data (e.g. changing alphanumeric text to all capital letters, all lower case letters, sentence case, etc.; changing fractional amounts to decimals or vice versa; scaling the data to a predetermined value (e.g. percentages to values between 0.0 and 0.1); or any other type and form of normalization or pre-processing). In some implementations, data may be cleaned by removing sensitive information, such as patient names, social security numbers, dates of birth, etc. In many of these implementations, cleaning data may be performed via a RegEx filter or match to a predetermined pattern, for example nn-nnn-nnnn for social security numbers.

At step 304, in some implementations, data may be filtered before performing matching or correlations. Specifically, in some instances, the system may be able to determine that some data (structured or unstructured) will be unmatchable, and such data may be removed to avoid wasting processing time at step 306. For example, in some implementations, data may be considered unmatchable if it does not conform to a particular pattern of a set of patterns (e.g. purely numeric data, alphanumeric data with alphabetical characters only in certain positions, purely alphabetical data, data with specific characters designated unusable (e.g. "#" or """), null data, or any other such data). In another implementation, data may be filtered due to incompleteness of the entire subset or lack of sufficient data. For example, a scanned image of a document may be too noisy or dirty for subsequent processing by OCR, and attempting to do so may result in no data or limited data. If a document is expected to have, for example, a dozen distinct fields of unstructured data, but only one is recoverable, that particular item of data may be complete (e.g. and thus not be filtered due to null characters or being incomplete in that field), but it may be pointless to try to match the document to other related documents as any attempt would have low confidence or accuracy (e.g. a transaction record where only the date is retrievable and all of the other fields are unreadable, or a health record that only includes the patient's blood pressure reading with no other identifiable information).

At step 306, the system may apply one or more logical sorts, comparisons, or tests to subsets of structured and unstructured data 210, 212. In some implementations, this may be done in parallel, while in other implementations, the sorts, comparisons, or tests may be applied iteratively. For example, in some implementations, as discussed above, each logical test or comparison may have an associated confidence score or level. The sorts, comparisons, or tests may be applied in order of highest confidence to lowest confidence in some such implementations. This may allow for removal of matched or classified unstructured data at each iteration, allowing successive iterations to be performed faster and more efficiently. In another similar implementation, sorts, comparisons, or tests that are faster to compute may be performed first; unstructured data that is sorted or matched may be excluded in subsequent iterations, allowing for a reduced workload as processing complexity increases. Examples of sorts, comparisons, or tests that may be applied include regular expression matching; aggregated sum matching (e.g. totaling unstructured data values and comparing the sum to a structured data value identified as a total, implying that the unstructured data values may be line items or components); or other such algorithms. For example, in some implementations, the sorts, comparisons, or tests may include pair or joint matching, or comparing pairs (or triples, or other size sets) of structured data values from a first document or file, such as a date and total amount, to pairs (or corresponding triples or other sets) of unstructured data values appearing in a second document or file, with the presence of a matching pair indicating a relatively high likelihood that the documents or files are related. Such pairs may be related (e.g. line items and totals) or unrelated (e.g. date and amount), with less related values potentially decreasing the likelihood of false positives (e.g. because line items are components of a total, correlations are more likely in unrelated documents). Different subsets of data values included in a matching test may thus have different associated confidence scores or levels.

In various implementations, other comparisons may be used including between different documents of the same or distinct types. For example, unstructured data from a note may be compared to structured data from a mortgage (or vice versa, or structured and unstructured data from both may be compared or matched). In another implementation, data may be compared between different types of sources, such as a scanned document (e.g. a scanned mortgage agreement) and a database (e.g. an identity authentication system).

In some implementations, data may be compared from a plurality of sources simultaneously. For example unstructured data from a scanned document may be compared to structured data in a first database and structured data in a second database for three-way correlations or matches or for sorting the data between the different sources together. For example, data from a scanned document may be correlated with subscriber or user information in a database and transaction or access log data in another database. Such documents, databases, or other sources may be accordingly mixed or combined in any matter, and each may include structured and/or unstructured data.

In some implementations, the system may determine or identify a "primary" document from a set of documents (e.g. a plurality of subsets of structured and/or unstructured data). For example, via the sort or matching, the system may determine that three scanned images are all images of sequential pages from a larger document. This may be done in many instances despite the scanned images (or OCR'd or otherwise captured data) lacking page numbers, Bates numbers, or other sequential identifiers. For example, in some implementations, the system may determine that a plurality of subsets of data are all correlated as coming from the same source. This may be responsive to matching fields or data, such as account numbers, user identifiers, times and dates, order numbers, sequentially related data or data that has an inherent or implicit order (e.g. log entries describing an access to a system, retrieval of data, and disconnection from the system), or any other such information. The system may then select an "initial" or "first" document or subset of the data. This may be based on its inclusion of additional generic or non-sequential data (e.g. a cover page that includes more generalized data such as a name, address, contact information, etc. and/or lacks more specific data such as individual test results, transactions, subtotals, etc.). The resulting output data may be identified as primary, secondary, tertiary, etc., data or may be otherwise associated and ordered (e.g. with added page numbers, sequence numbers, or any other such identifiers).

As shown, the output of the logical comparators 306 may be matched data 310 (e.g. matched or sorted or otherwise correlated unstructured and structured data), or unmatched data. In many implementations, matched data 310 may be excluded from subsequent iterations of comparisons or tests while unmatched data 308 may be returned and retested. Once complete, output data 312 may include the matched structured and unstructured data, including an identification of relationships or matches between the data sets, as well as any remaining unmatched unstructured data.

Figure 4:
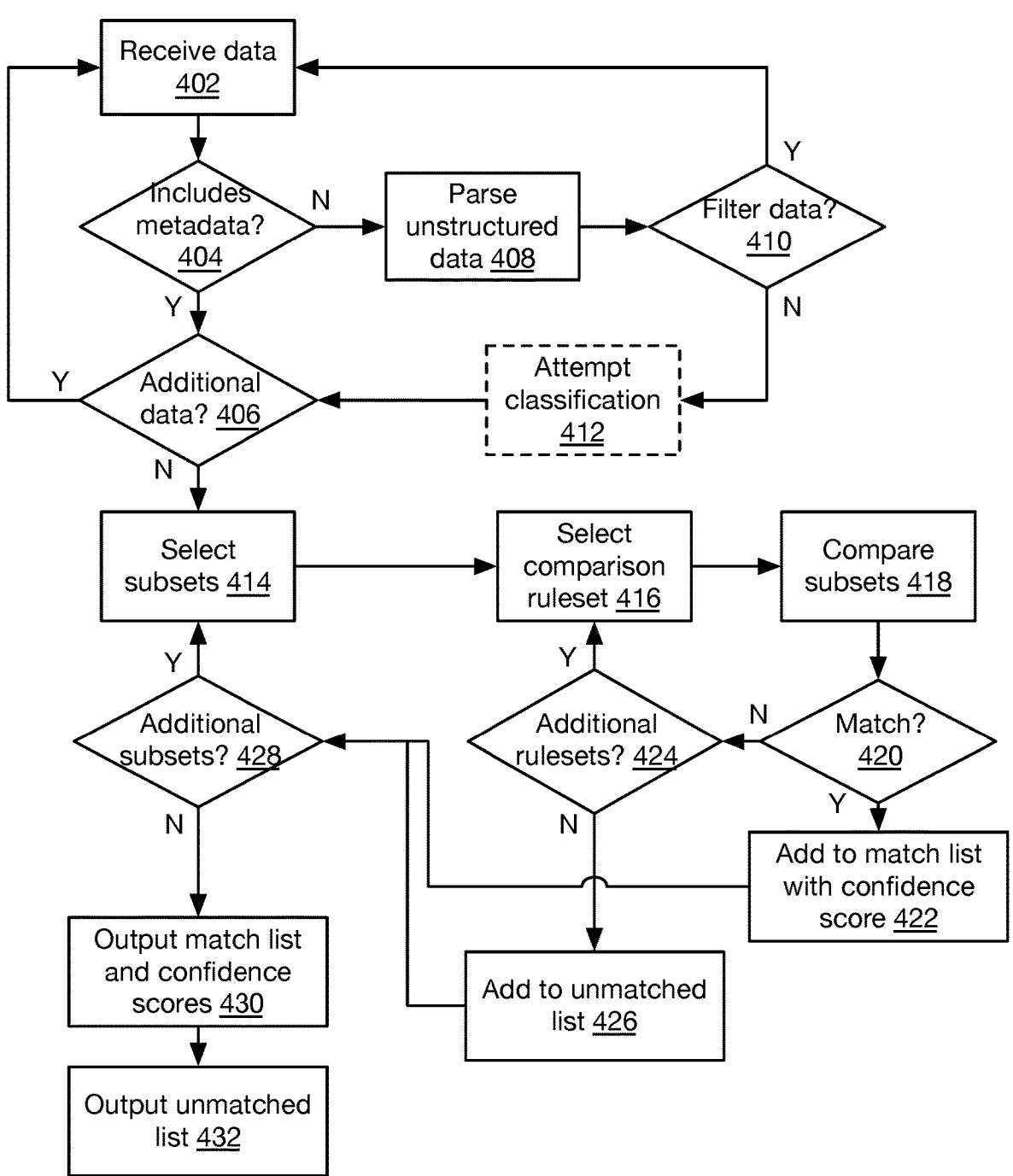
FIG. 4 is a flow chart of a method for unstructured and structured data-driven sorting, according to some implementations.

FIG. 4 is a flow chart of a method for unstructured and structured data-driven sorting, according to some implementations. At step 402, a system (e.g. computing device or devices, processors of devices, cloud computing devices, or any combination of these or other devices) may receive an item of data or a set of data (e.g. a document, a file, etc.). As discussed above, data may be retrieved from a storage device (e.g. hard disk(s) or solid state storage, etc.), from a network device (e.g. cloud storage, network-attached storage devices, or other storage servers), or from ingest devices (e.g. document scanners, cameras, etc.). The raw data may be in any suitable format, such as images, binary data, alphanumeric data, spreadsheets, or any combination of these or other formats.

At step 404, the system may determine whether the received item or set of data includes metadata. In some implementations, metadata may be present in a header of a file or elsewhere within the file (e.g. XML or HTML tags, names or parameters in name-value or parameter-value pairs, explicit type definitions or tags, field labels, etc.). In other implementations, metadata may be included in an accompanying file or associated data. If metadata is present, then the ingested or received item or set of data may be considered structured data. At step 406, the system may determine if there is additional data to be received, and steps 402-406 may be repeated.

If metadata is not present, the data may be considered unstructured. At step 408, in some implementations, the system may parse or extract the unstructured data to convert or normalize the data values. For example, the system may perform optical character recognition on a scanned image of a document or page, may convert or scale numerical values into predetermined ranges, etc. Where a received document includes multiple items of data, in some implementations at step 408, the individual items of data may be separated or individually identified (e.g. associated with unique identifiers or indices for subsequent processing). For example, in some implementations, received data may comprise a plurality of data values w In some implementations, at step 410, the system may determine whether the parsed or extracted unstructured data set or item of data should be filtered or excluded from further processing. For example, if the data item includes a null value or one having improper syntax (e.g. ineligible characters or an alphanumeric pattern that does not match a filter), in some implementations the item of data may be discarded or separated and identified as unmatchable or unsortable. This may be referred to variously as filtering, cleaning, or pre-sorting data, or by similar terms.

In some implementations, at step 412, the system may attempt to classify the unstructured data items. For example, classifying the data items may comprise applying one or more machine learning algorithms to analyze or parse the unstructured data including its relationship to other data items (e.g. neighboring pages or documents), extracting stamps or other images within a page that may indicate a document type or structure, applying templates with prede- termined fields having specified syntax such as fixed lengths in characters or ranges of valid values, etc. Classified data may be considered structured data, in some implementa- tions, or may be considered unstructured data with candidate structure (e.g. candidate labels, identifiers, metadata, etc.). In some implementations, step 412 may be skipped. Steps 402-412 may also be repeated for additional items of data.

At step 414, the system may select a subset of structured data and a subset of unstructured data. For example, the structured data may comprise a plurality of data sets, each comprising a plurality of values for a corresponding plural- ity of fields, such as name-value pairs or fields having specified metadata or tags. The unstructured data may com- prise a plurality of data sets generated via optical character recognition from a plurality of printed documents or forms (e.g. electronic health records, handwritten notes, transac- tion information, printed spreadsheets, etc.). The selected subsets of data may comprise all of the data from a single document, data from a plurality of documents, or a portion of data from a document (e.g. a header portion of a docu- ment). The selected subsets of data need not be equal in size. For example, in one implementation, the subset may com- prise an account identifier from a structured data set, and a plurality of unstructured data values from an unstructured data set to be compared with the account identifier.

At step 416, the system may select a ruleset for a comparison or sort. As discussed above, in some implemen- tations, a comparison or sort may use a regular expression or regex to process the unstructured data. Selecting a ruleset may comprise selecting the regular expression to use from a plurality of predetermined regular expressions. As discussed above, in some implementations, the system may perform comparisons or sorts iteratively; accordingly, at each itera- tion, in such implementations, the system may select pro- gressively lower confidence value-associated rulesets for application (e.g. starting with the highest confidence set and proceeding to the lowest confidence set).

At step 418, in some implementations, the system may compare values of the selected subsets of structured and unstructured data. In some implementations, this may com- prise comparing a single value of structured data to each of a plurality of values of unstructured data to identify a match, or sorting the values and selecting an unstructured data value adjacent or neighboring the structured data value post- sorting. In some implementations, as discussed above, com- paring values of the subsets may comprise comparing pairs, triplets, or other numbers of values in various combinations. For example, in one such implementation, given three structured data values from a set and ten unstructured data values, the system may compare the structured data values to unstructured data values $\{1, 2, 3\}, \{1, 2, 4\}, \{1, 2, 5\} \ldots \{1, 2, 10\}, \{1, 3, 4\}, \{1, 3, 5\} \ldots \{8, 9, 10\}$. Thus, each potential combination may be tested. In some implementa- tions, each item (or tuple, or plurality) of structured data values may be tested or compared against all unstructured data values. This may be particularly efficient for sorting algorithms. At each subsequent iteration, different items (or tuples or pluralities) of structured data values may then be tested or compared with the unstructured data values. In a similar implementation, each item (or tuple or plurality) of unstructured data values may be tested or compared against all structured data values at each iteration. In other imple- mentations, the comparisons or sorts may be parallelized by having different computing devices (or processors or virtual machines) use different selected subsets of structured and unstructured data.

In some implementations, at step 420, the system may determine if there's a match (or if there are several matches, a closest match). In some implementations, the system may select an adjacent value post-sort as a match. In a further implementation, the system may determine whether a post- sort unstructured data value is within a predetermined range (e.g. absolute or percentage, or has a number of alphanu- meric characters in common) with the corresponding adja- cent structured data value, and if so, identify the unstruc- tured data value as a match. For example, in one such implementation, given a plurality of unstructured alphanu- meric strings and a structured alphanumeric string associ- ated with metadata in a list, the system may sort the strings, select the post-sort unstructured string that is adjacent to the structured string in the sorted list, and identify the unstruc- tured string as matching the structured string if greater than a predetermined percentage of their alphanumeric characters are identical (e.g. 50%, 80%, 90%, or any such value). This may be done with an efficient bitwise XNOR operation, for example. If the system identifies a match, then at step 422, the matching unstructured data value(s) and structured data value(s) may be added to a matched data list. In some implementations, a confidence score based on the compari- son ruleset may be added to the list in association with the matched data value(s).

If the unstructured data does not match the structured data, then in some implementations, at step 422, the system may determine whether there are additional rulesets for sorts or comparisons to be applied. If so, steps 416-424 may be repeated iteratively. In some implementations, at each rep- etition, a lower confidence ruleset may be selected to be applied, as discussed above.

If there are no additional rulesets, in some implementa- tions at step 426, the system may add the unstructured data value(s) to an unmatched list or list of output unstructured data with no associated metadata. In other implementations, such as where subsets of unstructured data and structured data are selected at step 414 that are smaller than the entire data set, then step 426 may be skipped until no additional subsets are available.

At step 428, the system may determine whether there are additional subsets of data to be considered. For example, different combinations of structured data values and unstruc- tured data values from the corpus may be selected. If so, steps 414-426 may be repeated iteratively for each addi- tional subset of data.

If there are no additional subsets of data to be processed or considered, then at step 430, the system may output the matched data list (e.g. sets of structured data and associated unstructured data values, metadata, and in some implemen- tations, confidence scores). If any unstructured data items remain that are unmatched or still lack metadata, then at step 432, the system may output the unstructured data items as an unmatched list. In some implementations, the unmatched list may also include any unstructured data items filtered at step 410.

Accordingly, implementations of the systems and meth- ods discussed herein provide for sorting, correlation, and/or matching of structured and unstructured data. In some implementations, metadata associated with structured data may be applied to unstructured data based on the results of the sort or correlation. Such sorting or matching may be performed through an efficient iterative process with progressive confidence scores, and use a priori knowledge from correlations between structured data values to identify potentially associated unstructured data values.

In a first aspect, the present disclosure is directed to a method for matching data sets in different formats. The method includes receiving, by one or more processors of a computing device, a first plurality of data sets, each data set comprising a plurality of values associated with a corresponding plurality of metadata. The method also includes receiving, by the one or more processors, a second plurality of data sets generated via optical character recognition (OCR) from a plurality of printed documents. The method also includes, for each data set in the first plurality of data sets: iteratively comparing, by the one or more processors, subsets of the plurality of values to each data set in the second plurality of data sets until identifying a match between the data set in the first plurality of data sets and a data set in the second plurality of data sets; wherein at each iteration, the subset of the plurality of values is different. The method also includes outputting, by the one or more processors, a list of data sets in the first plurality of data sets and corresponding matched data sets in the second plurality of data sets.

In some implementations, each subsequent iteration uses a lower confidence comparison. In some implementations, each data set of the second plurality of data sets includes unstructured data. In some implementations, a data set of the second plurality of data sets comprises a second plurality of values associated with the corresponding plurality of metadata, and a number of the second plurality of values is smaller than a number of the plurality of metadata.

In some implementations, a first data set in the first plurality of data sets is matched to a second data set in the second plurality of data sets, and the first data set is different than the second data set. In a further implementation, the first data set comprises a first subset of values matching values of the second data set, and a second subset of values not matching values of the second data set. In another further implementation, the first subset of values correspond to fields associated with higher confidence matches than the second subset of values. In still another further implementation, the first subset of values correspond to fields associated with lower confidence matches than the second subset of values. In still another further implementation, the first data set in the first plurality of data sets is matched to the second data set in the second plurality of data sets, responsive to a first value in the first data set having a similarity score to a second value in the second data set greater than a first threshold but less than a second threshold.

In some implementations, the method includes excluding, by the one or more processors, a subset of data sets from the second plurality of data sets prior to the iterative comparing, responsive to values of the subset of data sets matching a predetermined filter rule.

In a second aspect, the present disclosure is directed to a system for matching data sets in different formats. The system includes one or more processors, and a memory device storing a first plurality of data sets, each data set comprising a plurality of values associated with a corresponding plurality of metadata. The one or more processors are configured to receive a second plurality of data sets generated via optical character recognition (OCR) from a plurality of printed documents. The one or more processors are also configured to, for each data set in the first plurality of data sets: iteratively compare subsets of the plurality of values to each data set in the second plurality of data sets until identifying a match between the data set in the first plurality of data sets and a data set in the second plurality of data sets; wherein at each iteration, the subset of the plurality of values is different. The one or more processors are also configured to output a list of data sets in the first plurality of data sets and corresponding matched data sets in the second plurality of data sets.

In some implementations, each subsequent iteration uses a lower confidence comparison. In some implementations, each data set of the second plurality of data sets includes unstructured data. In some implementations, a data set of the second plurality of data sets comprises a second plurality of values associated with the corresponding plurality of metadata, and a number of the second plurality of values is smaller than a number of the plurality of metadata.

In some implementations, a first data set in the first plurality of data sets is matched to a second data set in the second plurality of data sets, and wherein the first data set is different than the second data set. In a further implementation, the first data set comprises a first subset of values matching values of the second data set, and a second subset of values not matching values of the second data set. In a still further implementation, the first subset of values are associated with higher confidence matches than the second subset of values. In another still further implementation, the first subset of values are associated with lower confidence matches than the second subset of values. In another further implementation, the first data set in the first plurality of data sets is matched to the second data set in the second plurality of data sets, responsive to a first value in the first data set having a similarity score to a second value in the second data set greater than a first threshold but less than a second threshold.

In some implementations, the one or more processors are further configured to exclude a subset of data sets from the second plurality of data sets prior to the iterative comparing, responsive to values of the subset of data sets matching a predetermined filter rule.

B. Computing Environment

Having discussed specific embodiments of the present solution, it may be helpful to describe aspects of the operating environment as well as associated system components (e.g., hardware elements) in connection with the methods and systems described herein.

Figure 5A:
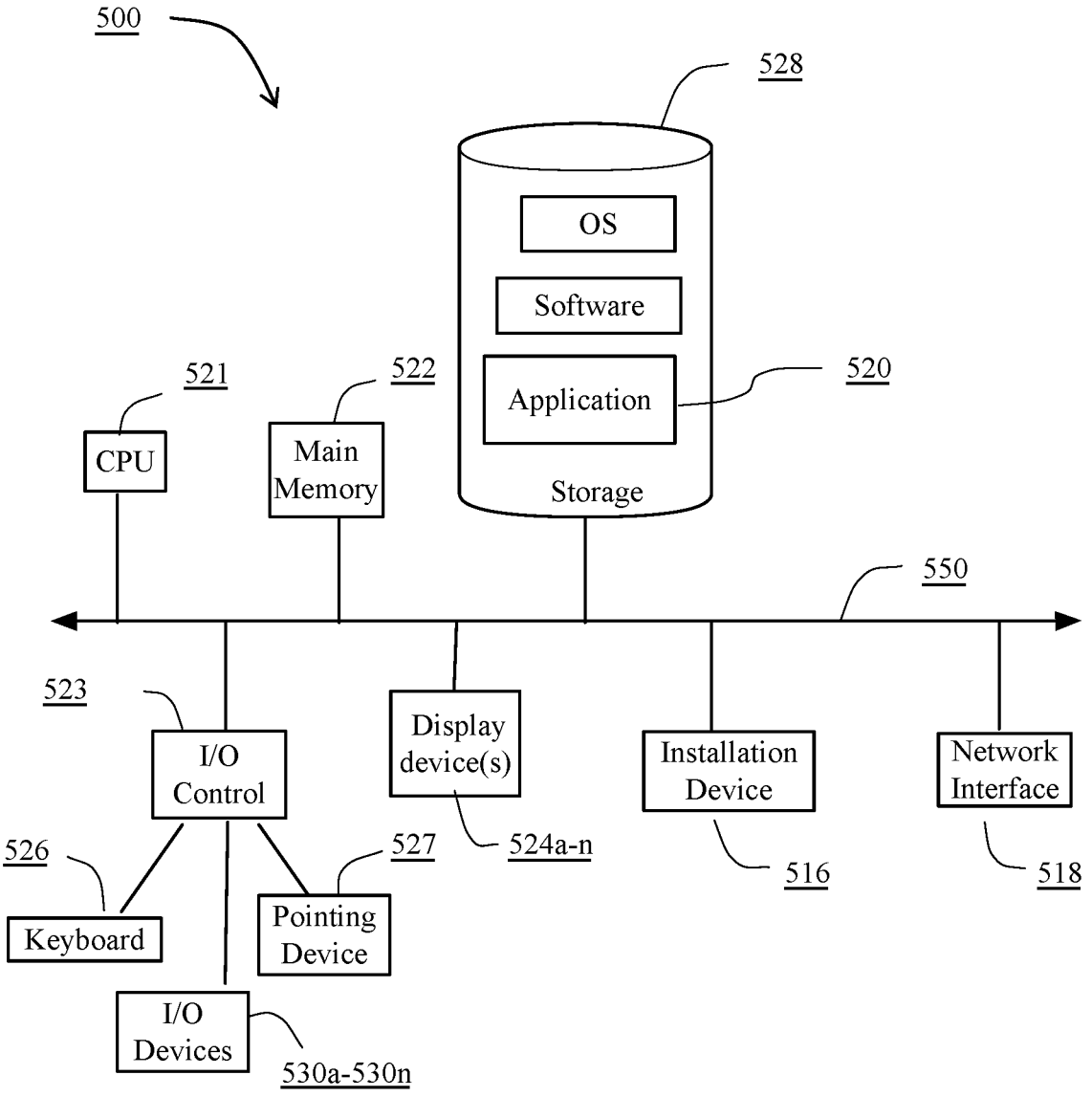
FIGS. 5A and 5B are block diagrams depicting embodiments of computing devices useful in connection with the methods and systems described herein.
Figure 5B:
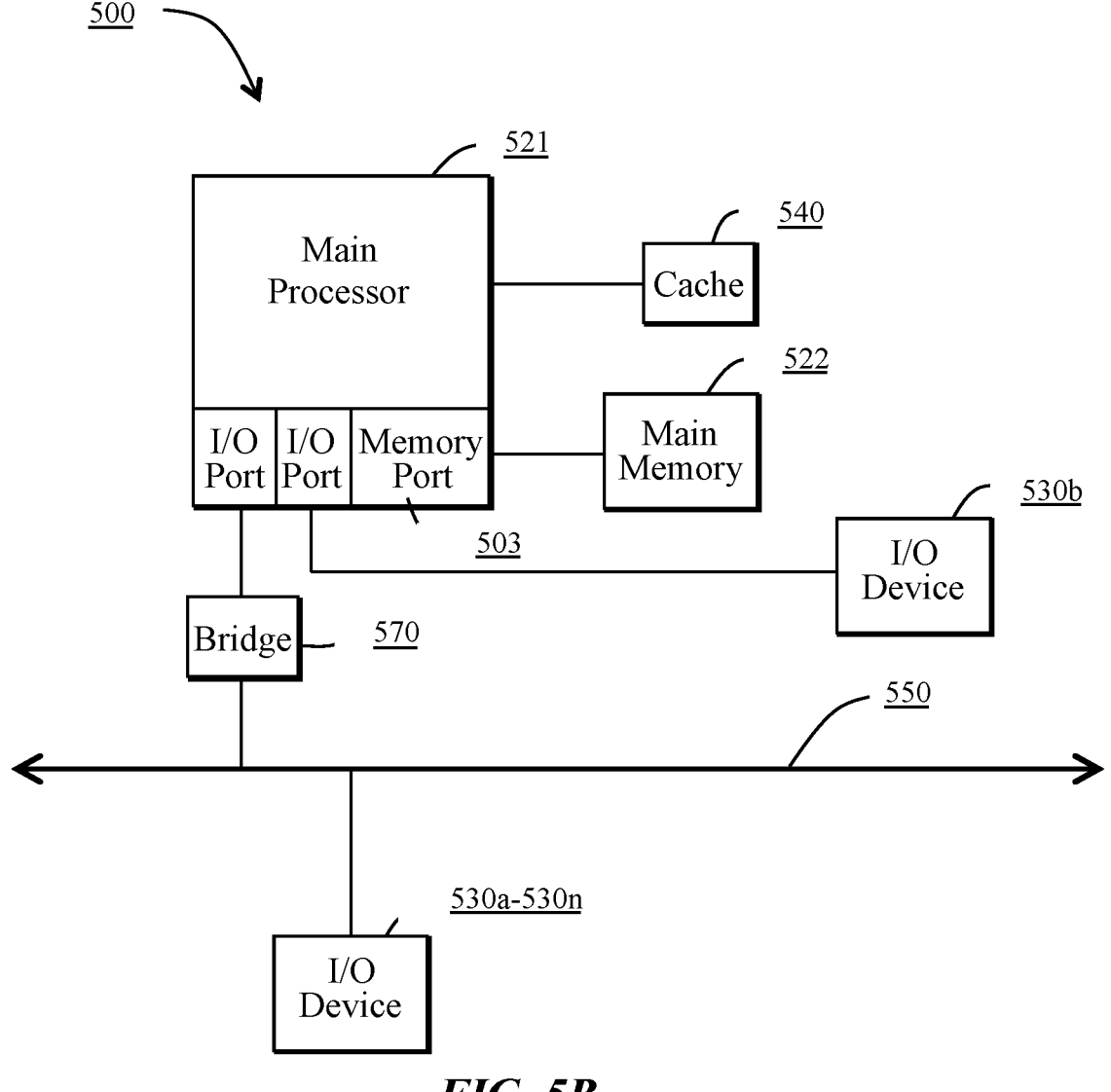

The systems discussed herein may be deployed as and/or executed on any type and form of computing device, such as a computer, network device or appliance capable of communicating on any type and form of network and performing the operations described herein. FIGS. 5A and 5B depict block diagrams of a computing device 500 useful for practicing an embodiment of the wireless communication devices 502 or the access point 506. As shown in FIGS. 5A and 5B, each computing device 500 includes a central processing unit 521, and a main memory unit 522. As shown in FIG. 5A, a computing device 500 may include a storage device 528, an installation device 516, a network interface 518, an I/O controller 523, display devices 524a-524n, a keyboard 526 and a pointing device 527, such as a mouse. The storage device 528 may include, without limitation, an operating system and/or software. As shown in FIG. 5B, each computing device 500 may also include additional optional elements, such as a memory port 503, a bridge 570, one or more input/output devices 530a-530n (generally referred to using reference numeral 530), and a cache memory 540 in communication with the central processing unit 521.

The central processing unit 521 is any logic circuitry that responds to and processes instructions fetched from the main memory unit 522. In many embodiments, the central processing unit 521 is provided by a microprocessor unit, such as: those manufactured by Intel Corporation of Mountain View, California; those manufactured by International Business Machines of White Plains, New York; or those manufactured by Advanced Micro Devices of Sunnyvale, California. The computing device 500 may be based on any of these processors, or any other processor capable of operating as described herein.

Main memory unit 522 may be one or more memory chips capable of storing data and allowing any storage location to be directly accessed by the microprocessor 521, such as any type or variant of Static random access memory (SRAM), Dynamic random access memory (DRAM), Ferroelectric RAM (FRAM), NAND Flash, NOR Flash and Solid State Drives (SSD). The main memory 522 may be based on any of the above described memory chips, or any other available memory chips capable of operating as described herein. In the embodiment shown in FIG. 5A, the processor 521 communicates with main memory 522 via a system bus 550 (described in more detail below). FIG. 5B depicts an embodiment of a computing device 500 in which the processor communicates directly with main memory 522 via a memory port 503. For example, in FIG. 5B the main memory 522 may be DRDRAM.

FIG. 5B depicts an embodiment in which the main processor 521 communicates directly with cache memory 540 via a secondary bus, sometimes referred to as a backside bus. In other embodiments, the main processor 521 communicates with cache memory 540 using the system bus 550. Cache memory 540 typically has a faster response time than main memory 522 and is provided by, for example, SRAM, BSRAM, or EDRAM. In the embodiment shown in FIG. 5B, the processor 521 communicates with various I/O devices 530 via a local system bus 550. Various buses may be used to connect the central processing unit 521 to any of the I/O devices 530, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 524, the processor 521 may use an Advanced Graphics Port (AGP) to communicate with the display 524. FIG. 5B depicts an embodiment of a computer 500 in which the main processor 521 may communicate directly with I/O device 530b, for example via HYPERTRANSPORT, RAPIDIO, or INFINIBAND communications technology. FIG. 5B also depicts an embodiment in which local busses and direct communication are mixed: the processor 521 communicates with I/O device 530a using a local interconnect bus while communicating with I/O device 530b directly.

A wide variety of I/O devices 530a-530n may be present in the computing device 500. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 523 as shown in FIG. 5A. The I/O controller may control one or more I/O devices such as a keyboard 526 and a pointing device 527, e.g., a mouse or optical pen. Furthermore, an I/O device may also provide storage and/or an installation medium 516 for the computing device 500. In still other embodiments, the computing device 500 may provide USB connections (not shown) to receive handheld USB storage devices such as the USB Flash Drive line of devices manufactured by Twintech Industry, Inc. of Los Alamitos, California.

Referring again to FIG. 5A, the computing device 500 may support any suitable installation device 516, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 500 may further include a storage device, such as one or more hard disk drives or redundant arrays of independent disks, for storing an operating system and other related software, and for storing application software programs such as any program or software 520 for implementing (e.g., configured and/or designed for) the systems and methods described herein. Optionally, any of the installation devices 516 could also be used as the storage device. Additionally, the operating system and the software can be run from a bootable medium.

Furthermore, the computing device 500 may include a network interface 518 to interface to the network 504 through a variety of connections including, but not limited to, standard telephone lines, LAN or WAN links (e.g., 802.11, T1, T3, 56kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 500 communicates with other computing devices 500' via any type and/or form of gateway or tunneling protocol such as Secure Socket Layer (SSL) or Transport Layer Security (TLS). The network interface 518 may include a built-in network adapter, network interface card, PCMCIA network card, card bus network adapter, wireless network adapter, USB network adapter, modem or any other device suitable for interfacing the computing device 500 to any type of network capable of communication and performing the operations described herein.

In some embodiments, the computing device 500 may include or be connected to one or more display devices 524a-524n. As such, any of the I/O devices 530a-530n and/or the I/O controller 523 may include any type and/or form of suitable hardware, software, or combination of hardware and software to support, enable or provide for the connection and use of the display device(s) 524a-524n by the computing device 500. For example, the computing device 500 may include any type and/or form of video adapter, video card, driver, and/or library to interface, communicate, connect or otherwise use the display device(s) 524a-524n. In one embodiment, a video adapter may include multiple connectors to interface to the display device(s) 524a-524n. In other embodiments, the computing device 500 may include multiple video adapters, with each video adapter connected to the display device(s) 524a-524n. In some embodiments, any portion of the operating system of the computing device 500 may be configured for using multiple displays 524a-524n. One ordinarily skilled in the art will recognize and appreciate the various ways and embodiments that a computing device 500 may be configured to have one or more display devices 524*a*-524*n*.

In further embodiments, an I/O device 530 may be a bridge between the system bus 550 and an external communication bus, such as a USB bus, an Apple Desktop Bus, an RS-232 serial connection, a SCSI bus, a Fire Wire bus, a Fire Wire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 500 of the sort depicted in FIGS. 5A and 5B may operate under the control of an operating system, which control scheduling of tasks and access to system resources. The computing device 500 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Washington; MAC OS, produced by Apple Computer of Cupertino, California; WebOS, produced by Research In Motion (RIM); OS/2, produced by International Business Machines of Armonk, New York; and Linux, a freely-available operating system distributed by Caldera Corp. of Salt Lake City, Utah, or any type and/or form of a Unix operating system, among others.

The computer system 500 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 500 has sufficient processor power and memory capacity to perform the operations described herein.

In some embodiments, the computing device 500 may have different processors, operating systems, and input devices consistent with the device. For example, in one embodiment, the computing device 500 is a smart phone, mobile device, tablet or personal digital assistant. In still other embodiments, the computing device 500 is an Android-based mobile device, an iPhone smart phone manufactured by Apple Computer of Cupertino, California, or a Blackberry or WebOS-based handheld device or smart phone, such as the devices manufactured by Research In Motion Limited. Moreover, the computing device 500 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C #, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

We claim:

1. A method for matching data sets in different formats, comprising:

receiving, by one or more processors of a computing device, a first plurality of structured data sets, each structured data set comprising a plurality of values associated with a corresponding plurality of metadata;

receiving, by the one or more processors, a second plurality of unstructured data sets generated via optical character recognition (OCR) from a plurality of printed documents, each unstructured data set of the second plurality of data sets lacking associated metadata;

selecting, by the one or more processors, a first subset of the plurality of values of a first structured data set;

applying, by the one or more processors, a first comparison ruleset associated with a first confidence score to the selected first subset of the plurality of values of the first structured data set and values of each unstructured data set;

identifying a match, by the one or more processors, between the selected first subset of the plurality of values of the first structured data set and the values of a first unstructured data set;

responsive to identifying the match, adding, by the one or more processors, metadata of the first structured data set to the first unstructured data set;

selecting, by the one or more processors, a second subset of the plurality of values of the first structured data set;

applying, by the one or more processors, a second comparison ruleset associated with a second, lower confidence score to the selected second subset of the plurality of values of the first structured data set and values of each unstructured data set, excluding the first unstructured data set, wherein applying the second comparison ruleset requires more processing resources than the first comparison ruleset;

identifying a match, by the one or more processors, between the selected second subset of the plurality of values of the first structured data set and the values of a second unstructured data set; and responsive to identifying the match, adding, by the one or more processors, metadata of the first structured data set to the second unstructured data set.

2. The method of claim 1, wherein a data set of the second plurality of data sets comprises a second plurality of values associated with the corresponding plurality of metadata, and a number of the second plurality of values is smaller than a number of the plurality of metadata.

3. The method of claim 1, wherein a first data set in the first plurality of data sets is matched to a second data set in the second plurality of data sets, and wherein the first data set is different than the second data set.

4. The method of claim 3, wherein the first data set comprises a first subset of values matching values of the second data set, and a second subset of values not matching values of the second data set.

5. The method of claim 4, wherein the first subset of values are associated with higher confidence matches than the second subset of values.

6. The method of claim 4, wherein the first subset of values are associated with lower confidence matches than the second subset of values.

7. The method of claim 3, wherein the first data set in the first plurality of data sets is matched to the second data set in the second plurality of data sets, responsive to a first value in the first data set having a similarity score to a second value in the second data set greater than a first threshold but less than a second threshold.

8. The method of claim 1, further comprising excluding, by the one or more processors, a subset of data sets from the second plurality of data sets prior to the iterative comparing, responsive to values of the subset of data sets matching a predetermined filter rule.

9. A system for matching data sets in different formats, comprising:

one or more processors, and a memory device storing a first plurality of structured data sets, each structured data set comprising a plurality of values associated with a corresponding plurality of metadata; and wherein the one or more processors are configured to:

receive a second plurality of unstructured data sets generated via optical character recognition (OCR) from a plurality of printed documents, each data set of the second unstructured plurality of data sets lacking associated metadata, select a first subset of the plurality of values of a first structured data set;

apply a first comparison ruleset associated with a first confidence score to the selected first subset of the plurality of values of the first structured data set and values of each unstructured data set;

identify a match between the selected first subset of the plurality of values of the first structured data set and the values of a first unstructured data set;

responsive to identifying the match, add metadata of the first structured data set to the first unstructured data set;

select a second subset of the plurality of values of the first structured data set;

apply a second comparison ruleset associated with a second, lower confidence score to the selected second subset of the plurality of values of the first structured data set and values of each unstructured data set, excluding the first unstructured data set, wherein applying the second comparison ruleset requires more processing resources than the first comparison ruleset;

identify a match between the selected second subset of the plurality of values of the first structured data set and the values of a second unstructured data set; and responsive to identifying the match, add metadata of the first structured data set to the second unstructured data set.

10. The system of claim 9, wherein a data set of the second plurality of data sets comprises a second plurality of values associated with the corresponding plurality of metadata, and a number of the second plurality of values is smaller than a number of the plurality of metadata.

11. The system of claim 9, wherein a first data set in the first plurality of data sets is matched to a second data set in the second plurality of data sets, and wherein the first data set is different than the second data set.

12. The system of claim 11, wherein the first data set comprises a first subset of values matching values of the second data set, and a second subset of values not matching values of the second data set.

13. The system of claim 12, wherein the first subset of values are associated with higher confidence matches than the second subset of values.

14. The system of claim 12, wherein the first subset of values are associated with lower confidence matches than the second subset of values.

15. The system of claim 11, wherein the first data set in the first plurality of data sets is matched to the second data set in the second plurality of data sets, responsive to a first value in the first data set having a similarity score to a second value in the second data set greater than a first threshold but less than a second threshold.

16. The system of claim 9, wherein the one or more processors are further configured to exclude a subset of data sets from the second plurality of data sets prior to the iterative comparing, responsive to values of the subset of data sets matching a predetermined filter rule.

* * * * *